No. 839,623.  
PATENTED DEC. 25, 1906.

W. J. & C. G. McDOUGALL.  
DEVICE FOR HOLDING WHEELS UPON AXLES.  
APPLICATION FILED MAR. 14, 1906.

Witnesses  
Inventors  
Wm. J. McDougall and  
Chas. G. McDougall,  
By Franklin H. Hough  
his Atty.

UNITED STATES PATENT OFFICE.

WILLIAM J. McDOUGALL AND CHARLES G. McDOUGALL, OF DANFORTH, ILLINOIS.

DEVICE FOR HOLDING WHEELS UPON AXLES.

No. 839,623.     Specification of Letters Patent.     Patented Dec. 25, 1906.

Application filed March 14, 1906. Serial No. 306,089.

*To all whom it may concern:*

Be it known that we, WILLIAM J. McDOUGALL and CHARLES G. McDOUGALL, citizens of the United States, residing at Danforth, in the county of Iroquois and State of Illinois, have invented certain new and useful Improvements in Devices for Holding Wheels Upon Axles; and we do hereby declare the following to be a full, clear, and exact description of the invention, such as will enable others skilled in the art to which it appertains to make and use the same, reference being had to the accompanying drawings and to the letters of reference marked thereon, which form a part of this specification.

This invention relates to new and useful improvements in apparatus for holding boxes upon axles, and comprises a simple and efficient means whereby the outer end of the axle will be held in an inclosed box, making it impossible for dust or sand to enter from the outer end of the hub, and comprises a fixed collar upon the axle, which is interposed between a rotatable nut having threaded connection with the box and the latter.

Our invention is clearly illustrated in the accompanying drawings, which, with the letters of reference marked thereon, form a part of this application, and in which—

Figure 1:
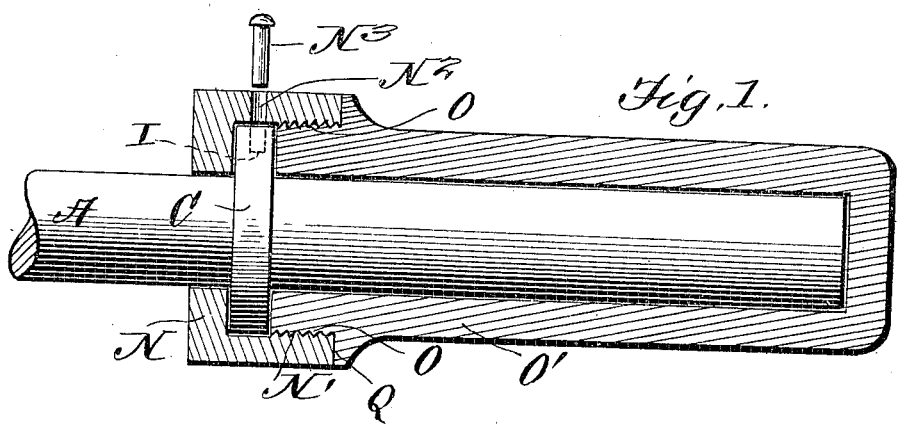
Figure 2:
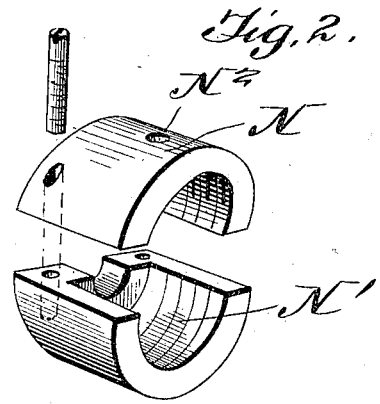

Figure 1 is a sectional view longitudinally through our invention, and Fig. 2 is a detail perspective view of the two shell-sections which retain the boxing.

Reference now being had to the details of the drawings by letter, A designates the axle of a vehicle provided with an integral collar C, formed at any suitable location thereon, and N designates a sectional cup made up, preferably, of two complemental pieces which are fastened together and having threads N' upon the inner surface thereof and adapted to fit over the threads O, formed upon the boxing O'. A shoulder Q is formed upon the boxing and serves as an abutment to limit the movement of the cup in one direction. The collar C upon the axle A has a hole I therein adapted to be brought into registration with an aperture $N^2$, formed in the cup N, whereby a pin $N^3$ may be inserted in said aperture and hole to hold the cup from rotation when it is desired to screw the boxing in place within the cup, after which the pin may be removed.

From the foregoing it will be noted that by the provision of the apparatus shown and described a simple and efficient means is afforded for holding a wheel upon an axle and providing a closed end to the box, thereby preventing dust or sand from entering the outer end of the hub and at the same time preventing the escape of lubricant therefrom.

What we claim is—

An apparatus for holding hubs upon axles comprising, in combination with an axle having a fixed collar thereon, a boxing having an annular flange and a threaded shoulder, two complemental shell-sections each having a recess or cut-away portion in its inner end, said shell-sections having registering apertures formed in the ends thereof, one upon either side of the central opening or cut-away portion thereof, screws adapted to be fitted in said registering apertures, whereby the shell-sections may be held together, as set forth.

In testimony whereof we hereunto affix our signatures in the presence of two witnesses.

WILLIAM J. McDOUGALL.
    CHARLES G. McDOUGALL.

Witnesses for W. J. McDougall:
    F. E. SINGLETON,
    WM. F. BABCOCK.

Witnesses for Charles G. McDougall:
    ERNEST SEVERY,
    MINNIE KOELKER.